(No Model.)

H. P. CHRISTIE.
SELF SHIPPING BELT PULLEY.

No. 292,987. Patented Feb. 5, 1884.

Witnesses:
Geo. A. Dickson
G. W. Emerson

Inventor:
Henry P. Christie
by E. E. Osborn Att'y

UNITED STATES PATENT OFFICE.

HENRY PITHIE CHRISTIE, OF SAN FRANCISCO, CALIFORNIA.

SELF-SHIPPING BELT-PULLEY.

SPECIFICATION forming part of Letters Patent No. 292,987, dated February 5, 1884.

Application filed November 27, 1883. (No model.)

*To all whom it may concern:*

Be it known that I, HENRY P. CHRISTIE, a native of Scotland and subject of the Queen of Great Britain and Ireland, residing in the city and county of San Francisco, State of California, have made and invented certain new and useful Improvements in Self-Shipping Belt-Pulleys; and I do hereby declare that the following is a full, clear, and exact description of my said invention and the manner in which I proceed to construct, apply, and use the same.

My invention relates to a device for throwing a driving-pulley into and out of action with the belt by which motion is taken from the pulley to operate machinery; and it consists, essentially, in a novel character of stationary belt-holder, and a driving-pulley having a lateral shifting movement upon its shaft, and otherwise of such peculiar construction that it slides over or telescopes with the stationary holder when moved in one direction, and thereby automatically ships the belt upon itself, while by a contrary movement, being drawn away from the stationary holder, it deposits and leaves the belt behind it upon that surface. As a result of this operation, the belt is not moved or shifted out of position, and is in motion only when in engagement with the driving-pulley.

Figure 1:
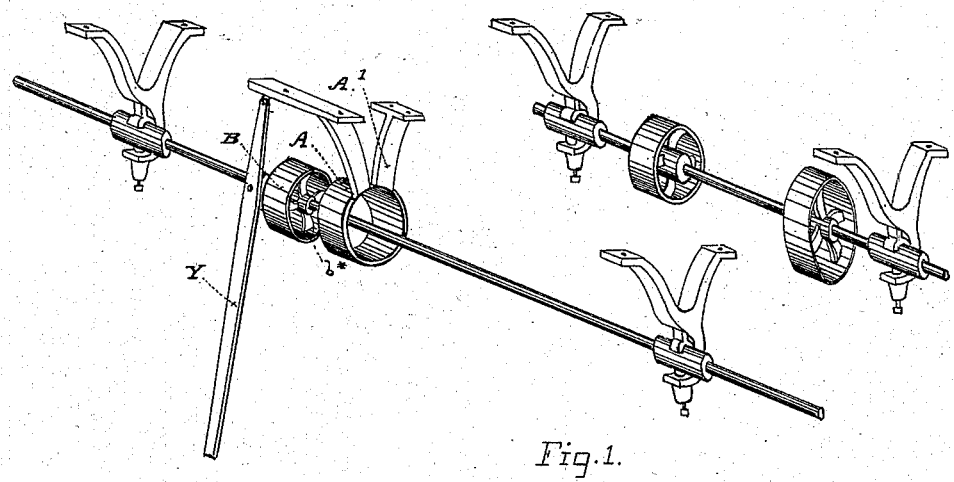
Figure 2:
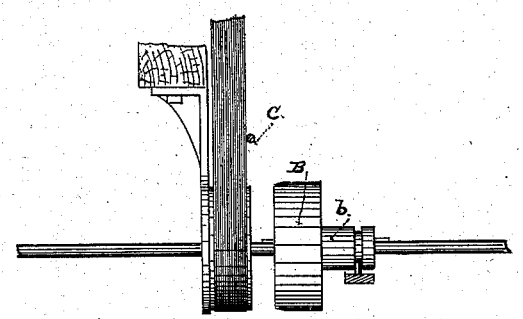
Figure 3:
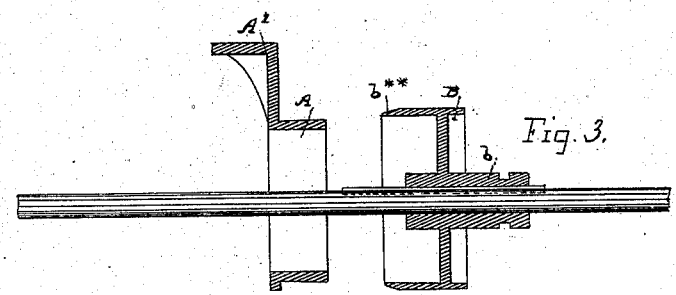
Figure 4:
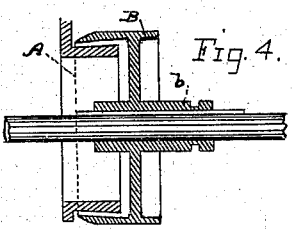

Referring to the accompanying drawings, Figure 1 is a perspective view, showing a power-shaft supported in hangers, and having my invention applied with relation to the belt from a counter-shaft, to which motion is to be applied from the power-shaft. Fig. 2 is a view in elevation. Fig. 3 is a longitudinal section through the parts, Fig. 2; and Fig. 4 is a section through the parts when telescoped.

A represents a stationary belt-holding surface, substantially of cylindrical form, and fixed to or made in one piece with a part, A', that may be either a bracket, a hanger, or a standard, and is generally of such form that it serves to fix and support the rim A in position in accurate line at one side of the driving-pulley. The face of this cylindrical part is tapered regularly from the outside edge, and the diameter at this larger end is of equal measurement with the internal diameter of the rim of the driving-pulley at the adjacent side that first engages with this stationary tapered surface. The rim of the pulley B is likewise tapered internally, to correspond with the outside taper of the part A, so that as the parts overlap, and are thrown one over the other, a space is left between the opposing surfaces. The possibility of actual contact between revolving and the stationary surfaces when thus telescoped—such as might occur from adjustment of the shaft or pulley—is thus rendered very small. The first contact of the edges of these two parts is required to be a close one, as in this operation the edge of the pulley-rim enters between the belt and the stationary tapered rim, and thereby transfers the belt onto itself. The driving or belt pulley B is fixed to its shaft by a slot and feather, and a shifting hand-lever, Y, is connected with its hub $b$, for moving the pulley longitudinally on the shaft and into and out of working relation with the fixed rim A. The web, or arms $b^*$, if it be an open pulley, are set to one side of the center, so as to give a clear space within the pulley equal at least to the width of face of the fixed part A, and a long hub, $b$, is employed to give increased bearing and steadiness to the pulley. Of these parts, therefore, the part A is a stationary ring, forming a belt-supporting surface, and the pulley is arranged and formed to slip closely over the holder, and to take the belt from its surface by this telescoping movement.

To facilitate the entrance of the pulley in between the belt and the fixed surface, the near side of the rim is beveled, as at $b^{**}$, to give a thin edge. The belt is set to run in line with the fixed holding-surface A, as the driving-pulley, and not the belt, is shifted to run or to stop the machinery, and any tendency of the belt to follow the pulley is prevented by placing a guide, $c$, at one side of the belt to stop such lateral movement. Now, by this construction, the belt is shipped and unshipped by the simple movement of the pulley in a longitudinal direction on its shaft. When the pulley-rim telescopes over the fixed rim, the belt is transferred upon and receives motion from the pulley, while the separation of the two parts leaves the belt at rest upon the fixed holder.

Having thus fully described my invention, what I claim, and desire to secure by Letters Patent, is—

1. A self-shipping belt-pulley consisting of the pulley part B, fixed to, but capable of longitudinal movement upon, its driving-shaft, a stationary belt receiving and holding part A independent of the driving shaft and pulley, but capable of entering or telescoping within the pulley-rim from one side thereof, and a means for shifting the pulley, substantially as hereinbefore described.

2. The combination together of the fixed belt-holding surface, composed of the tapering rim A and the laterally-movable pulley B, with beveled edge, and of suitable diameter internally to slip over and telescope with the fixed rim, substantially as hereinbefore described.

3. The combination, with the fixed rim A, tapered externally, of the movable pulley B, having its rim tapered internally, and with sufficient clearance inside to allow the two parts to telescope, substantially as hereinbefore described.

HENRY PITHIE CHRISTIE. [L. S.]

Witnesses:
EDWARD E. OSBORN,
JNO. L. TAGGARD.